Figure 1:
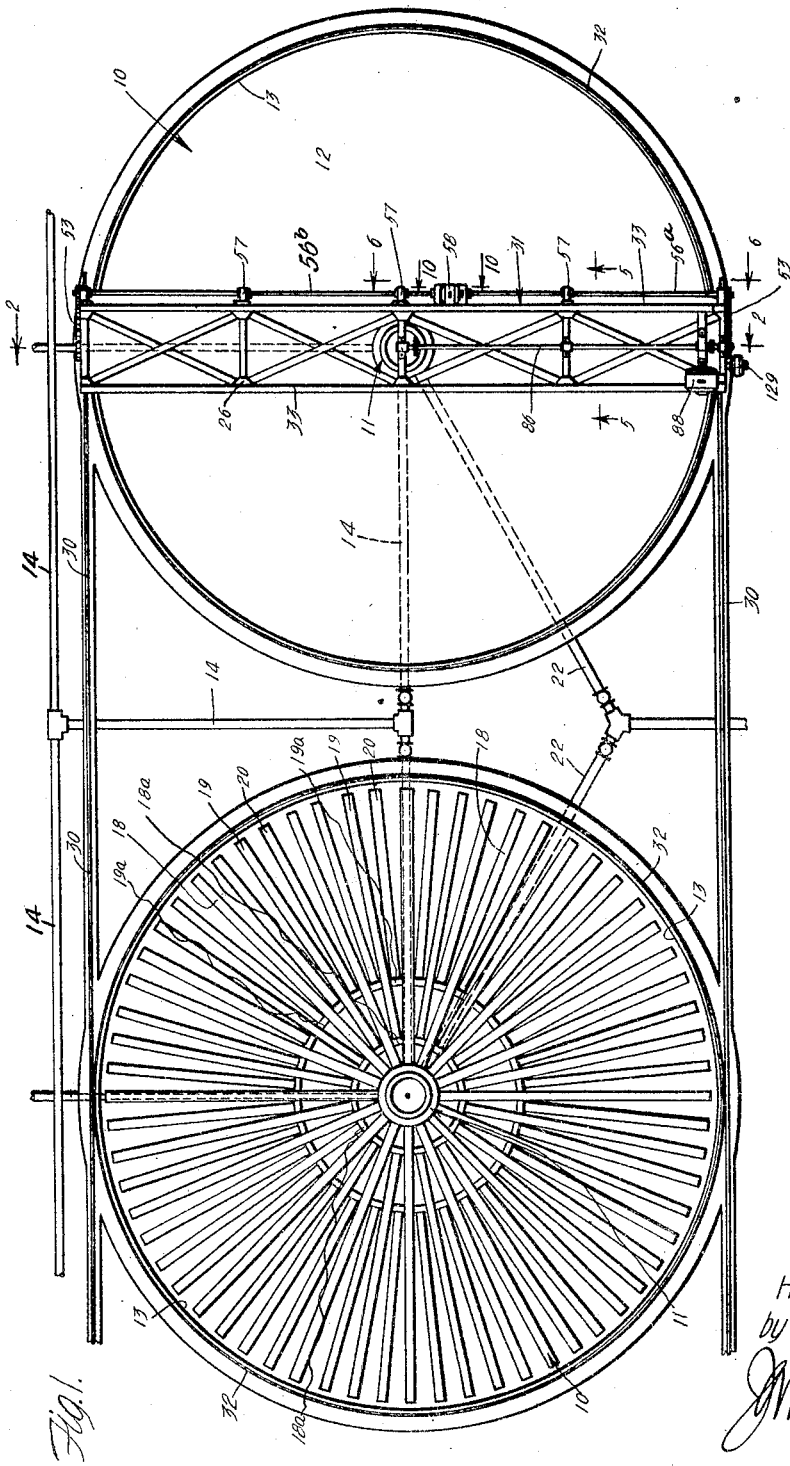

Oct. 26, 1926.  1,604,379
H. W. BLAISDELL
FILTER AND FILTER CLEANER
Original Filed May 26, 1919    4 Sheets-Sheet 1

Inventor
Hiram W. Blaisdell
by
his Attorney.

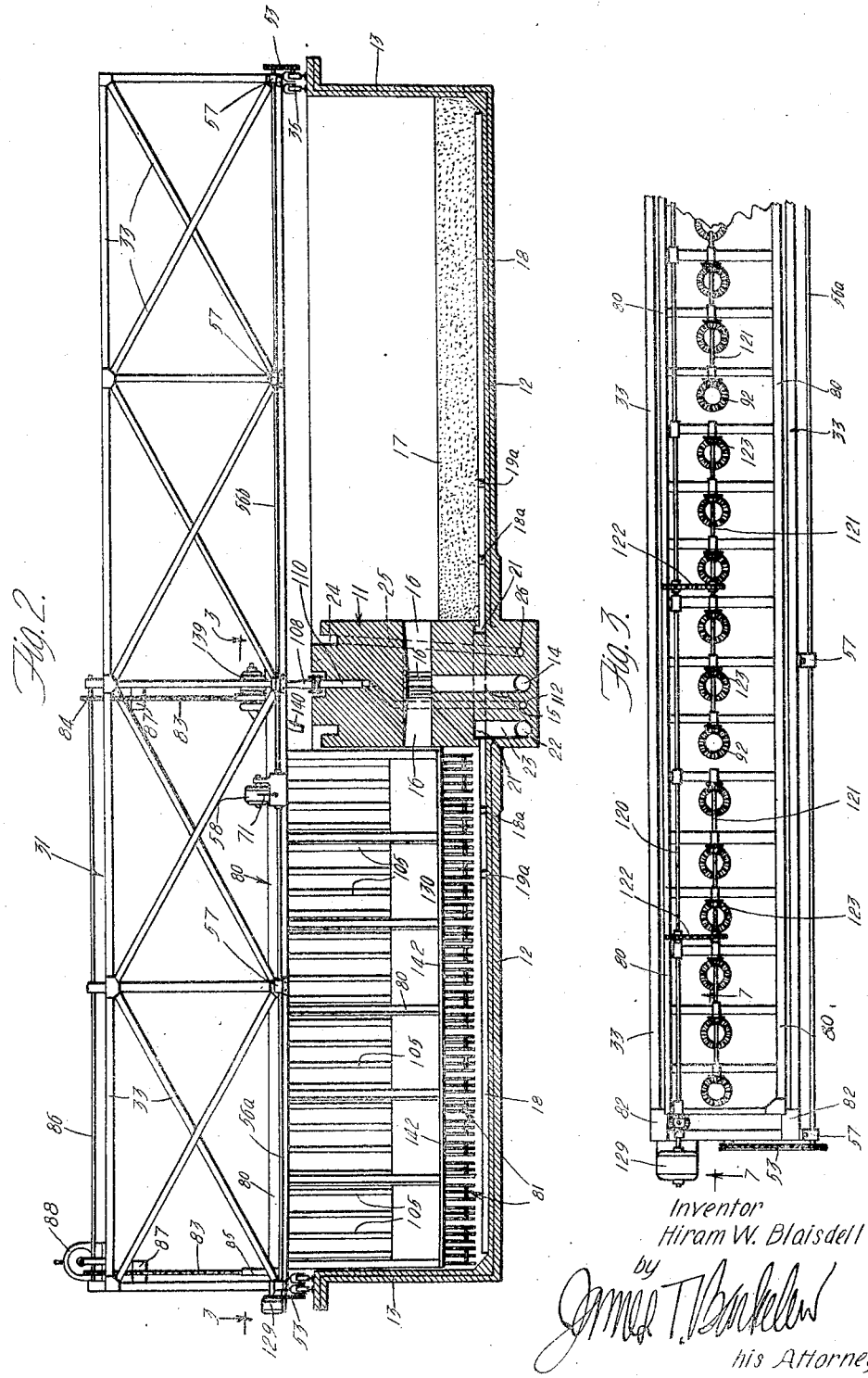

Oct. 26, 1926.
H. W. BLAISDELL
FILTER AND FILTER CLEANER
Original Filed May 26, 1919  4 Sheets-Sheet 3
1,604,379
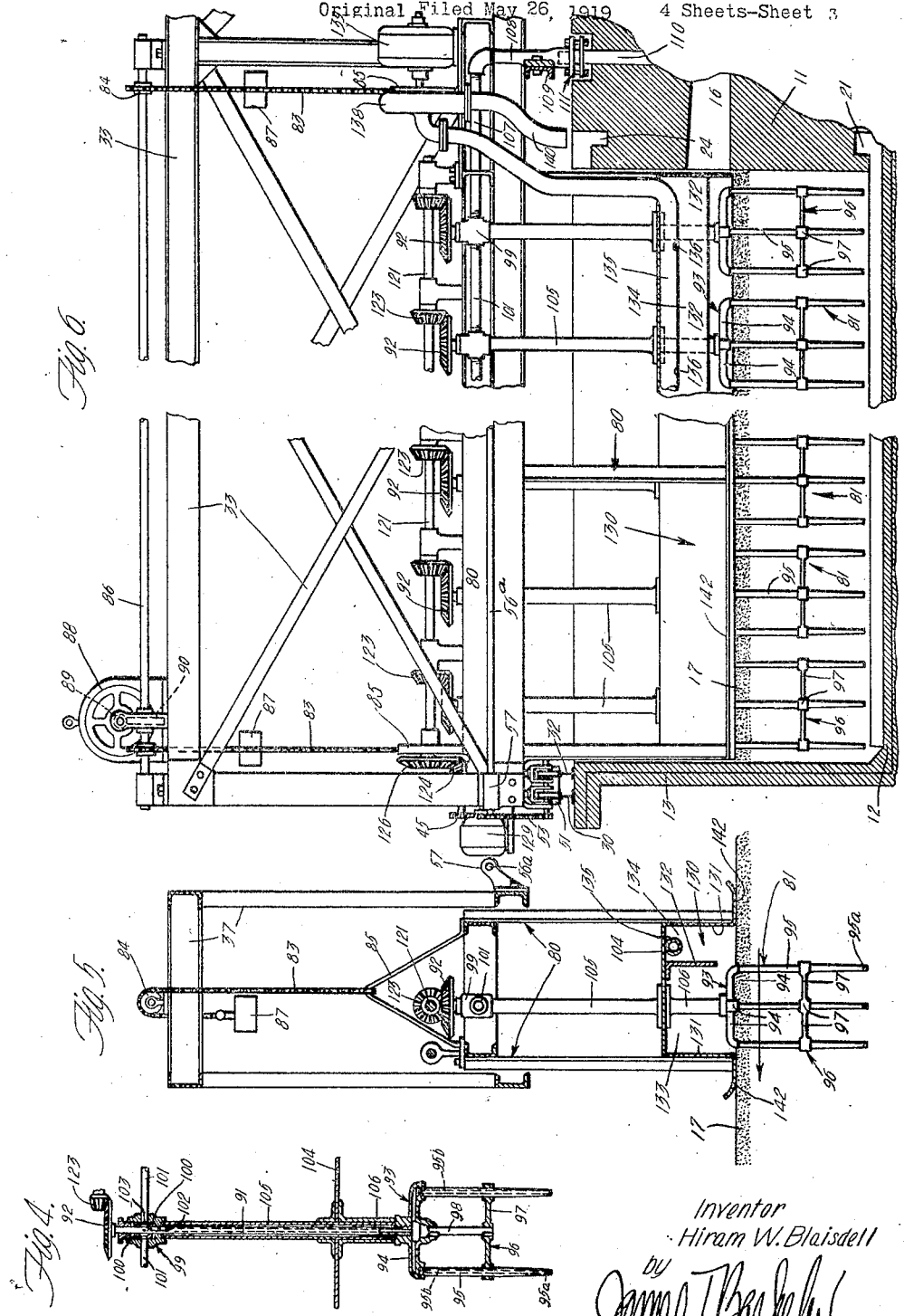
Inventor
Hiram W. Blaisdell
by
James T. Barlow
his Attorney.

Oct. 26, 1926.
H. W. BLAISDELL
FILTER AND FILTER CLEANER
Original Filed May 26, 1919   4 Sheets-Sheet 4
1,604,379
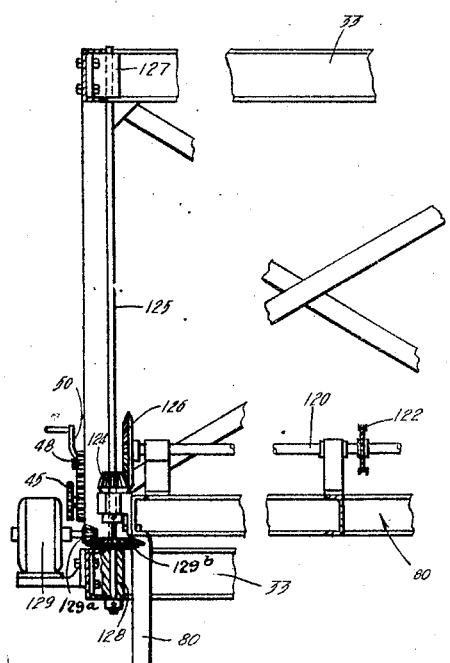
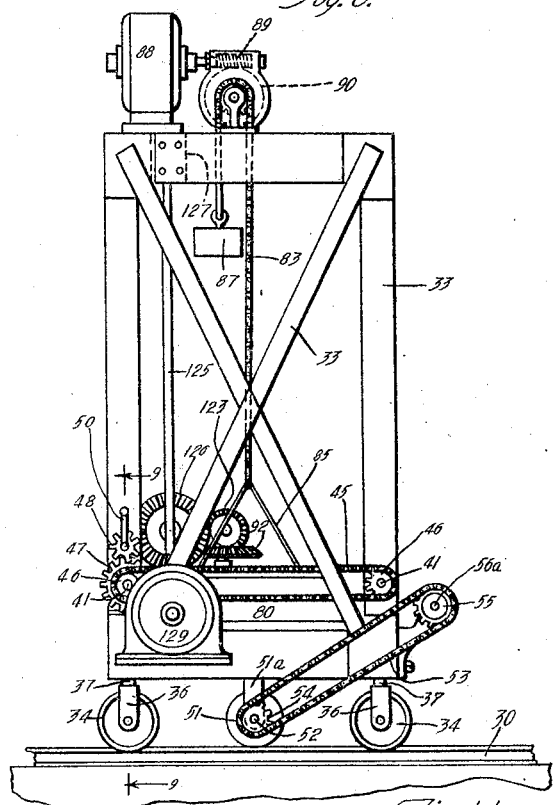
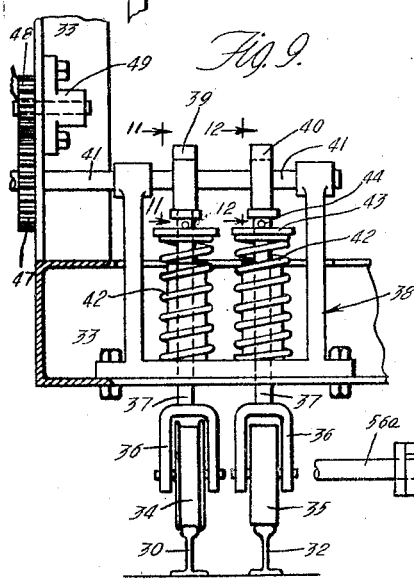
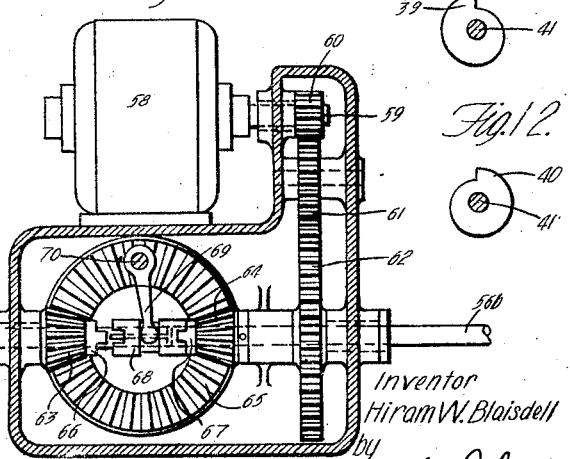
Inventor
Hiram W. Blaisdell
by
his Attorney Patented Oct. 26, 1926.

1,604,379

UNITED STATES PATENT OFFICE.

HIRAM WHEELER BLAISDELL, OF LOS ANGELES, CALIFORNIA, ASSIGNOR TO THE BLAISDELL FILTRATION COMPANY, A CORPORATION OF DELAWARE.

FILTER AND FILTER CLEANER.

Application filed May 26, 1919, Serial No. 299,935. Renewed June 19, 1922. Serial No. 569,555.

This invention relates to water or other filters and the combination therewith of filter cleaners adapted to clean the sand or other filter bed of such filters. It may be stated as a general broad object of the invention to provide a filter and cleaner combination in which a circular filter bed may be used and in which one cleaning mechanism will suffice for a plurality of such circular beds.

There are many advantages inherent in a filter bed of circular formation. The water may be distributed to or from, or both to and from, a central point in the filter, and all parts of the bed may be thus supplied with an equal distribution of water, there being no corners or other parts in which the water becomes relatively stagnant. In my invention I provide a circularly moving cleaner for such a circular filter bed. I provide means for operatively connecting the rotating cleaner to any one circular filter bed; and also provide means for readily transferring the cleaner mechanism from one filter bed to another. The filter bed may have a central distributing and collecting pier which serves to hold the distributing and collecting pipes and passages; and this central pier may also serve to support a central pivot upon which the cleaning mechanism may rotate when attached to the filter. The cleaning mechanism, according to my invention, may be supported at its outer end upon a circular track around the filter bed; and suitable means are employed for driving the cleaning mechanism around the filter bed. Wheels are also provided to run upon the transfer track extending between adjacent filter beds; and a simple wheel-moving mechanism transfers the carriage of the cleaning mechanism from a circular track to the transfer track whenever desired.

The foregoing more or less broadly describes a preferred form of my invention, from which the general features of the arrangement and combination will be understood. However, in order to give a complete understanding of the invention I now describe in specific detail a preferred form of filter and cleaner combination embodying the invention. It will, however, be understood that I do not limit myself at all to the specific arrangement and details hereinafter described, as many different modifications and changes may be made without departing from the general scope of my invention. For instance, I explain in detail a particular type of stirring and cleaning device for cleaning the filter bed. This I do in order to show a complete and operative mechanism which will be typical of my invention; but it will be understood that there are many other specific types of filter bed cleaning devices which may be used in this connection. For the purposes of this specific and detailed description, I now refer to the accompanying drawings, in which—

Fig. 1 is a plan view of two filter basins showing the general arrangements of the pipes, the tracks and the cleaner; Fig. 2 is an enlarged section taken as indicated by line 2—2 on Fig. 1, showing a filter basin in section with the cleaner in place; Fig. 3 is an enlarged section taken as indicated by line 3—3 on Fig. 2 showing the manner in which the cleaner units are driven; Fig. 4 is a vertical central section of a stirrer unit; Fig. 5 is an enlarged section taken as indicated by line 5—5 on Fig. 1; Fig. 6 is an enlarged view taken as indicated by line 6—6 on Fig. 1; Fig. 7 is an enlarged view taken as indicated by line 7—7 on Fig. 3; Fig. 8 is an enlarged end view of the cleaner; Fig. 9 is an enlarged detailed section as indicated by line 9—9 on Fig. 8; Fig. 10 is an enlarged detailed section showing the gear arrangement which controls the movement of the cleaner; Fig. 11 is a section taken as indicated by line 11—11 on Fig. 9; and Fig. 12 is a section taken as indicated by line 12—12 on Fig. 9.

In the drawings numeral 10 designates circular filter basins which have central piers 11. The filter basins may be made of reinforced concrete or the like and comprise a bottom 12 and a side wall 13. The pier 11 may also be made of concrete and can be made integral with the rest of the basin structure. The raw or unfiltered water is conducted to the central pier 11 through pipes 14, this water may come from a settling basin or any suitable source. The pipes 14 enter the bottom of piers 11 and the water discharging from said pipes is carried upwardly through port 15 and is discharged into the basins through radial openings 16.

The water after passing through the cleaning sand 17 seeps into collector pipes 18, 19 and 20. The collector pipes are made of porous tile or the like and may be either square or round in cross section. They are preferably arranged as shown in the basin to the left in Fig. 1. There are long collector pipes 18 which extend radially from the edge of the basin to the pier 11. Extending between pipes 18 a short distance out from pier 11 are headers 18ª from which collector pipes 19 extend radially outward to the edge of the basin, and between collector pipes 18 and 19 are headers 19ª similar to headers 18ª from which collector pipes 20 extend radially outward to the edge of the basin. Water seeping into collector pipes 20 flows to headers 19ª where it is discharged into collector pipes 18 and 19 and the water which has seeped into collector pipe 19 together with what has been discharged from collector pipes 20 is discharged into collector pipes 18 through header 18ª. The collector pipes 18ª then discharge the water into a circular port 21 in pier 11. The water in circular port 21 is discharged into outlet pipe 22 through port 23. At the top of pier 11 is a circular trough 24 which in connection with drain pipes 25 and 26 forms a means by which any excess of water in the basin may be carried off. This trough and its drain pipe also provide means of carrying off the wash water from the cleaner, as hereinafter described.

The filter basins 10 are connected by rails 30 which are adapted to carry cleaning mechanism 31. Around each basin 10 is a rail 32 which is adapted to carry the cleaning mechanism 31 when it is operating. The cleaning mechanism 31 comprises a carrying frame 33 which is supported by wheels 34 and 35. There is a wheel 34 and a wheel 35 under each corner of the frame. The wheels 34 are flanged and are adapted to operate on transfer rails 30 while the wheels 35 are not flanged and are adapted to operate on circular rails 32. The wheels 34 and 35 are carried by yokes 36 which are mounted on the end of rods 37. The rods 37 are carried in a frame 38, which is mounted on the carrier frame 33, and are engaged at their upper ends by cams 39 and 40. The rods 37 are kept in engagement with the cams 39 and 40 by means of springs 42 which extend between the frame 38 and rings 43, which are held on rods 37 by means of pins 44. The two shafts 41 at each corner of the ends of the carrier frame are connected by means of a chain 45 which runs over sprockets 46 mounted on shafts 41, and on one shaft 41 at each end of the frame 33 is mounted a gear 47 meshing with a pinion 48. The pinion 48 is carried by a bracket 49 and is provided with a crank handle 50. When pinion 48 is rotated shaft 41 will be rotated through gear 47 and the cams 39 and 40 will be rotated. When the cams 39 and 40 are rotated either wheels 34 or 35 will be raised depending upon the direction in which the cams are rotated. If, for example, wheels 34 are raised wheels 35 will remain down while if wheels 35 are raised wheels 34 will remain down. This action is due to the shape and position of the cams, as shown in Figs. 11 and 12. There is however, a position, as shown in Fig. 9, at which both wheels are on the same level. The mechanism just described provides a means by which the carrier frame 33 may be carried either by wheels 34 or wheels 35.

At each end of the frame 33 there is a traction wheel 51 which is carried on a shaft 52 supported by a bracket 51ª. The traction wheels 51 are driven by means of chains 53 which run over sprockets 54 and 55. Sprockets 54 are mounted on shafts 52 while one of the sprockets 55 is mounted on shaft 56ª and the other is mounted on shaft 56ᵇ. Shafts 56ª and 56ᵇ are carried in bearings 57 which are spaced along frame 33. The shafts 56ª and 56ᵇ are driven by motor 58 through the arrangement of gears, about to be described. Mounted on motor shaft 59 is a pinion 60 which through idler-gear 61 drives gear 62 which is mounted on shaft 56ᵇ. Keyed to shaft 56ᵇ is a small bevel-gear 64 which drives a large bevel-gear 65, and loosely mounted on shaft 56ª is a small bevel-gear 63 which is driven by bevel-gear 65. Gears 63 and 64 are provided with clutch members 66 and 67, respectively. Slidably keyed on shaft 56ª is a slidable clutch member 68 which is controlled by lever 69 and is adapted to engage either clutch member 66 or 67. Lever 69 is mounted on shaft 70 on which is mounted operating lever 71. When lever 71 is in such a position as to cause clutch member 68 to be in engagement with clutch member 67 shafts 56ᵇ and 56ª are both driven in the same direction, and when lever 71 is in a position to cause clutch member 68 to be in engagement with clutch member 66 shafts 56ª and 56ᵇ will be driven in opposite direction through the bevel-gear arrangement just described. The mechanism just described makes it possible to drive the traction wheels 51 either in the same direction or in opposite direction; the utility of which will hereinafter be described.

A vertically movable frame that carries stirrer units 81 is slidably mounted in guides 82 (see Fig. 3) on frame 33. The frame 80 is adapted to be raised and lowered and is suspended from shaft 86 by means of chains 83 which are attached to brackets 85 on frame 80, and run over sprockets 84, which are mounted on shaft 86. Weights 87 are attached to chains 83 in order to partially counterbalance the weight of the frame 80 and also to keep the chains in engagement with sprockets 84. The frame 80 is raised and lowered by rotation of shaft 86. Shaft 86 is driven by reversible motor 88 through a worm 89, which is mounted on the motor shaft, and a worm wheel 90 which is mounted on shaft 86. There is a plurality of stirrer units 81 mounted in frame 80. Each stirrer unit 81 comprises a central hollow shaft 91 carrying at its top a bevel-gear 92. At the lower end of the hollow shaft 91 there is a spider 93 which has hollow arms 94. Extending downward from the outer ends of arms 94 are hollow teeth 95. The lower ends of teeth 95 are closed and there are small water discharge holes 95$^a$ which extend into the passage 95$^b$ in the teeth. The teeth 95, a little more than half way from the arms 94 to their lower ends are held by a bracing spider 96 which has solid arms 97. The spider 96 is supported by a shaft 98 which is mounted in the center of spider 93 and extends downward to the center of spider 96. At the top of shaft 91 directly below bevel-gear 92 there is a sleeve 99 which has two packing glands 100 between which there is a vertical space 103, as shown in Fig. 4. The spaces 103 in sleeves 99 are connected by means of connecting pipes 101. There is a hole 102 in each shaft 91 which connects the inside of the shaft with the space 103 between the packing glands 100. Between the lower end of sleeves 99 and the plate 104 there are housings 105 which enclose the shafts but do not touch them. And from the underside of plate 104 to the tops of spiders 93 there are similar housings 106. The sleeve 99 on the stirrer unit nearest to the pier 11 is connected by means of a pipe 107 to a cup-shaped casting 108 which is mounted on cross member 109 of frame 80. The cup-shaped casting 108 fits over the pivot pipe 110, which is centrally located in the pier 11; and is adapted to be lifted away from the pivot pipe when the frame 80 is moved upwardly. The connection between the cup-shaped casting 108 and the pivot pipe 110 is made tight by means of a packing gland 111. Water is supplied to the pivot pipe 110 from any suitable source under pressure through a pipe 112 and the water from said pipe 112 flows through pivot pipe 110 into the cup-shaped casting 108 from which it is carried by means of pipe 107 to sleeve 99 of the stirrer unit closest to the pier 11. It is then carried from this unit to the other units by means of the pipe connections 101. From the sleeve 99 at the top of each stirrer unit 81 it is conducted through hole 102 into the inside of shafts 91 and passes through the shafts to the spiders 93. It is distributed through the hollow arms 94 of the spiders 93 to the teeth 95 where it flows through passage ways 95$^b$ and is discharged through holes 95$^a$. The connection between pivot pipe 110 and the cup-shaped casting 108 not only provides a passage way for liquid to be supplied to the stirrer units but also provides a pivotal connection about which the entire cleaning mechanism 31 revolves when the cleaner is in operation.

The stirrer units are driven from a main drive shaft 120. The stirrer units are divided into several groups which are driven by independent countershafts 121. The counter-shafts 121 are driven from the main drive shaft by means of chains 122. The counter shafts may be driven at different speeds; that is, the shafts nearest the pier may be driven at a slower speed than the ones near the edge of the basin. This difference in speed is obtained through the chain drives 122. The reason for thus driving the stirring units at different speed is to cause a practically uniform stirring of the sand. The units near the pier do not travel as fast through the bed nor clean as much sand as the ones near the edge. Therefore to uniformly agitate and clean the sand the outer stirrer must rotate faster than the inner ones. Mounted on the counter shafts 121 are bevel-gears 123 which engage gears 92. The main drive shaft 120 is driven by a bevel pinion 124 which is slidably keyed on a vertical shaft 125 and is carried by frame 80. This bevel pinion 124 engages a bevel-gear 126 mounted on the end of the main drive shaft 120. The vertical shaft 125 is carried in bearings 127 and 128 both of which are mounted on frame 33 and it is driven by a motor 129 through bevel-gears 129$^a$ and 129$^b$, bevel-gear 129$^a$ being mounted on the motor shaft and bevel gear 129$^b$ being mounted on the vertical shaft 125. The drive mechanism just described, provides a means by which the stirrer units may be driven when they are either in the raised, lowered or in any intermediate position.

Carried by frame 80 just above the spiders 93 there is a box shaped structure 130. This box shaped structure is formed by top plate 104 and the side walls 131. There is a partition 132 in the box structure 130 which extends from the top plate 104 downwardly almost to the spiders 93. This partition as shown in Fig. 5, divides the box structure 130 and forms two compartments 133 and 134. Compartment 133 is directly above the stirrer units while compartment 134 is to one side of the stirrer units. At the top of compartment 134 directly below the top plates 104 there is a suction pipe 135 on the under side of which are holes 136. The suction pipe 135 extends upwardly at the pier 11 and is connected to a centrifugal pump 138 driven by a motor 139. The centrifugal pump 138 discharges through pipe 140 into overflow trough 24. At the lower edges of side walls 131 of the box shaped structure 130 there are shoes 142, the edges of which are slightly turned up, as shown in Fig. 5, to press upon and smooth out the sand when the cleaner is in operation.

When the cleaning mechanism 31 is in operative position, as shown in Fig. 2, the teeth 95 extend down into the sand 17 and the shoes 142 of the box shaped structure press on the sand. The water which is to clean the sand is discharged through holes 95ª in the bottom of the teeth 95, and the stirrer units are rotated by the mechanism hereinabove described. The crank 50 has been operated so as to cause the wheel 34 to be raised away from transfer track 30 thus allowing wheels 35 to carry the mechanism 31. The operating lever 71 is shifted in such a manner as to cause the traction wheels 51 to be driven in opposite directions and in such direction as to cause the cleaning mechanism 31 to rotate about pivot pipe 110 in a direction which will cause suction pipe 135 to be on the trailing side of the mechanism. (See the arrow in Fig. 5.)

The cleaning water which is discharged from teeth 95 washes up through the sand which is being thoroughly agitated by the rotation of the teeth, and the suction pipe 135 draws off the water and the silt and sediment which is suspended in it. The compartment 134 forms a settling chamber in which the water is relatively still allowing the sand to settle out of the water. The water that enters pipe 135 is carried through pipe 140 and is discharged into trough 24 from which it is carried away through drain pipe 25.

As will be clearly understood from the drawings the cleaning unit upon rotating around the pivot pipe 110 will completely clean all of the sand in the filter as it leaves no corners or recesses that have not been passed over.

When one filter bed has been thoroughly cleaned and it is desired to move the mechanism 31 to another filter bed the cleaning water is turned off and the stirrer units are stopped. The frame 80 is then raised by the mechanism hereinabove described, thus lifting the stirrer units out of the basin. The casting 108 is disengaged from pivot pipe 110. The crank 50, is then operated so as to cause wheels 34 to be lowered and engage transfer tracks 30 while wheels 35 are raised. The operating lever 71 is then thrown in such a position as to cause traction wheels 51 to both be driven in the same direction and in such a direction as to cause the cleaning mechanism 31 to move along track 30 until it is over the filter bed which is next to be cleaned. Arriving in this position, the cleaner mechanism is put in operative connection with this filter bed, as will be readily understood.

Having described a preferred form of my invention, I claim:

1. In combination, a plurality of circular filter units each having a central pier through which liquid is distributed and collected, a revoluble filter cleaning mechanism, means whereby the cleaning mechanism can be pivotally connected to the central pier of any one of the filter units, and means for transporting the revoluble cleaning mechanism between filter units.

2. In combination, a plurality of circular filter units each having a central pier through which liquid is distributed and collected, a revoluble filter cleaning mechanism, means whereby the cleaning mechanism can be pivotally connected to the central pier of any one of the filter units, transfer rails extending between the several filter units, and transfer wheels on the cleaning mechanism adapted to run on the transfer rails.

3. In combination, a plurality of circular filter units each having a central pier through which liquid is distributed and collected, a revoluble filter cleaning mechanism, means whereby the cleaning mechanism can be pivotally connected to the central pier of any one of the filter units, a circular track around each filter unit, carriage wheels on the outer ends of the cleaning mechanism adapted to run on the circular track, transfer tracks extending between the several filter units, transfer wheels on the cleaning mechanism adapted to run on the transfer tracks, and means to move all said carriage and transfer wheels so that the cleaning mechanism may be carried on either a circular track or on the transfer track.

4. In combination, a plurality of circular filter units each having a central pier through which liquid is distributed and collected, a revoluble filter cleaning mechanism, means whereby the cleaning mechanism can be pivotally connected to the central pier of any one of the filter units, a circular track around each filter unit, carriage wheels on the outer ends of the cleaning mechanism adapted to run on the circular track, transfer tracks extending between the several filter units, transfer wheels on the cleaning mechanism adapted to run on the transfer tracks, and means for causing the co-operative movement of the carriage wheels and the transfer wheels to cause one to be moved down into engagement with its track and the other to lift from its track.

5. In combination, a plurality of circular walled filter basins each having a central pier through which liquid is distributed and collected, a circular track around the wall of each basin, transfer tracks extending between the several basins and substantially in the plane of the circular tracks, a revoluble frame having at its outer ends a set of carriage wheels adapted to run on the circular track of a basin and a set of transfer wheels adapted to run on the transfer tracks, means to raise and lower said wheels so as to support the frame on a circular track or on the transfer track; means to pivotally connect the frame with the central pier of any filter basin; and a filter bed cleaning device mounted on the frame and vertically movable thereon to be lowered into working relation to a filter bed and to be raised to clear a basin wall.

6. In combination, a plurality of circular walled filter basins each having a central pier through which liquid is distributed and collected, a circular track around the wall of each basin, transfer tracks extending between the several basins and substantially in the plane of the circular tracks, a revoluble frame having at its outer ends a set of carriage wheels adapted to run on the circular track of a basin, and a set of transfer wheels adapted to run on the transfer tracks, means to raise and lower said wheels so as to support the frame on a circular track or on the transfer track; means to pivotally connect the frame with the central pier of any filter basin; and a filter bed cleaning device carried by the frame and vertically movable thereon, embodying movable filter bed stirrers and means in connection therewith for delivering washing water to the filter bed and for carrying away water with suspended impurities washed from the filter bed; means for supplying washing water through the central pier to the filter cleaning device and conduits through the central pier into which the washing water is discharged after washing.

7. In combination, a circular filter basin having a central pier with liquid distributing and collecting passages therein, a circular track around the basin wall, a revoluble filter cleaning mechanism pivoted to the pier and having carrying wheels at its end running on the circular track; said mechanism embodying filter bed washing devices; and means to convey washing liquid to and from the washing devices embodying conduits through the central pier.

8. In combination, a circular filter basin; and a revolving filter cleaning mechanism connected therewith and embodying a plurality of rotatable filter bed stirring elements in a formation extending outwardly across the basin, means to revolve the whole cleaning mechanism about the center of the basin, and means to rotate the stirring elements and to rotate relatively faster those elements further from the center of revolution of the mechanism and relatively slower those elements nearer that center.

9. In combination with a circular filter basin, a revolving filter cleaning mechanism embodying a revoluble frame pivoted near the center of the basin and extending out toward the basin wall, filter cleaning devices carried by the frame and distributed along its length, said devices being movable with relation to the frame for their filter cleaning action; and means to move, with relation to the frame, those elements which are further removed from the center relatively faster and to move those nearer the center relatively slower.

10. A round filter basin provided with a marginal track and also having parallel tracks extending therefrom and alongside of the marginal track, a cleaner carriage spanning the basin and having flanged wheels for running upon the parallel tracks and also having wheels for running upon the marginal track, shifting means connected to the wheels to enable the carriage to run upon either the parallel tracks or the marginal track at will, traction wheels at the ends of the carriage for running upon either track, a motor upon said carriage for driving said traction wheels, and shiftable connections between the motor and the traction wheels, to enable the wheel at one end to be turned either oppositely or in the same direction as the wheel at the other end of the carriage.

11. A filtration system comprising a plurality of round basins provided with marginal tracks, parallel tracks connecting said basins, a cleaner comprising a carriage to span the basins and having at each end a traction wheel to run upon the tracks, said carriage provided with a motor to operate the traction wheels, means to cause the carriage to travel upon either a marginal track or the parallel tracks at will, and a shiftable connection from said motor to said traction wheels at the ends of said carriage, to cause the traction wheel at one end to revolve either oppositely or in the same direction as the traction wheel at the other end, said carriage having means to effect a central connection to any basin, for pivoting the carriage when running upon its marginal track.

12. A plurality of round filter basins each provided with a marginal track, parallel tracks extending alongside of the marginal tracks to connect the basins, a cleaner carriage to span any basin and having flanged wheels for running upon the parallel tracks and also having wheels for running upon any marginal track, shifting means connected to the wheels to enable the carriage to run upon either the parallel tracks or a marginal track at will, and traction wheels being provided at the ends of the carriage for running upon either track, said carriage having means to effect a central connection to any basin, for pivoting the carriage when running upon its marginal track, a motor upon said carriage for driving said traction wheels, and shiftable connections between the motor and the traction wheels, to enable the traction wheel at one end of the carriage to be run either oppositely or in the same direction as the traction wheel at the other end of the carriage.

13. A cleaner for a round filtration basin, comprising a carriage to span the basin, means to guide the carriage around the basin, a row of sand-stirring units mounted upon said carriage, each unit being rotatable about its own axis, and means simultaneously rotating said units, including means for imparting a higher speed of rotation to units remote from the center of the basin than to units near to said center.

14. A cleaner for a round filtration basin, comprising a carriage to span the basin, means to guide the carriage around the basin, a row of sand-stirring units mounted upon said carriage, each unit being rotatable about its own axis, and means simultaneously rotating said units, including means for causing the units nearest the center of rotation of the carriage to revolve at lower speed and clean less sand than the units remote from said center.

15. In combination, a circular water-filter basin having a central pier with liquid distributing and collecting passages therein, water-collecting channels radiating from said pier, and a revoluble filter-cleaning mechanism pivoted to the pier.

16. In combination, a circular water-filter basin having a sand bed and a central pier with water distributing and collecting passages therein, and a revoluble filter-cleaning mechanism pivoted to the pier, said mechanism embodying filter-bed stirring and washing devices, and means to convey washing liquid to and from the stirring devices, embodying conduits through the central pier.

17. In combination, a circular water-filter basin having a sand bed and a central pier with water distributing and collecting passages therein, and a revoluble filter-cleaning mechanism pivoted to the pier, said mechanism embodying filter-bed stirring devices, and means to convey wash water to and from the stirring devices, embodying conduits through the central pier, and including means to supply water through the stirrers to the sand.

18. In combination, a circular filter basin and a revolving filter-cleaning mechanism connected therewith, having filter-cleaning devices extending outwardly across the basin, said devices comprising movable filter-bed stirring elements, each individually movable relatively to others, and means to move those cleaning elements which are further removed from the center relatively faster in their filter-bed stirring motion and to move those nearer the center relatively slower in their filter-bed stirring motion.

19. In combination, a circular filter basin, and a revolving filter-cleaning mechanism connected therewith, having filter-cleaning devices extending outwardly across the basin, said devices comprising individually rotatable filter bed stirring elements, and means to rotate those cleaning elements which are further removed from the center relatively faster and those nearer the center relatively slower.

In witness that I claim the foregoing I have hereunto subscribed my name this 13th day of May, 1919.

HIRAM WHEELER BLAISDELL.